United States Patent [19]

Tachita et al.

[11] 4,310,907
[45] Jan. 12, 1982

[54] SCAN CONVERTER FOR A SECTOR SCAN TYPE ULTRASOUND IMAGING SYSTEM

[75] Inventors: Ryobun Tachita; Yoshihiro Hayakawa; Hiroshi Fukukita; Tsutomu Yano; Kazuyoshi Irioka; Akira Fukumoto, all of Kawasaki, Japan

[73] Assignee: Matsushita Electric Industrial Company, Limited, Osaka, Japan

[21] Appl. No.: 100,707

[22] Filed: Dec. 4, 1979

[30] Foreign Application Priority Data

Dec. 8, 1978 [JP] Japan .................................. 53-152389

[51] Int. Cl.³ ............................................. G01S 15/89
[52] U.S. Cl. .................................. 367/11; 343/5 SC; 73/626; 128/660; 358/112; 358/140
[58] Field of Search ................... 367/7, 11, 103, 123; 73/620, 625, 626; 128/660; 358/112, 140; 343/5 SC

[56] References Cited

U.S. PATENT DOCUMENTS 4,002,827  1/1977  Nevin et al. ................. 343/5 SC
4,127,034  11/1978 Lederman et al. ............... 73/626

FOREIGN PATENT DOCUMENTS 2061  5/1979  European Pat. Off. ............. 367/11

*Primary Examiner*—Richard A. Farley
*Attorney, Agent, or Firm*—Lowe, King, Price & Becker

[57] ABSTRACT

A scan converter is disclosed for use in a sector scan type ultrasound imaging system in which ultrasound echo signals return from targets along a plurality of radial scan lines distributed in a sector field with a substantially equal tangential angular increment with respect to a reference line. The scan converter comprises a sampling circuit which samples the echo signals at a speed inversely proportional to the cosine of the angle of deflection of the radial scan lines with respect to the reference line so that the sampled points align themselves in lateral lines perpendicular to the reference line. The sampled echo signals are converted into digital echo data and stored in a random access memory in the direction of its columns. The stored data are retrieved serially in the direction of the rows and fed into an interpolator for making interpolations between the successively retrieved echo data. The interpolation data are read into a line memory in succession with the data retrieved from the RAM during each raster scan interval, and then retrieved at a constant rate from preselected storage locations so that the data on the raster scan lines have approximately equal density. The retrieved data from the line memory are converted in analog signals and displayed on a viewing screen.

12 Claims, 8 Drawing Figures

SCAN CONVERTER FOR A SECTOR SCAN TYPE ULTRASOUND IMAGING SYSTEM

BACKGROUND OF THE INVENTION

The present invention relates generally to ultrasound imaging systems of the sector scan type, and in particular to a scan converter for the sector scan type ultrasound imaging system for converting echo signals generated in the sector scan field into signals for raster scan.

In the sector scan type ultrasound imaging system, piezoelectric transducers of a linear array are energized by successively delayed bursts of high frequency pulses so that the transmitted ultrasound energy forms a main ultrasound beam deflected at an angle depending on the delay intervals of the transducer array. The delay intervals are controlled so that the main beam is deflected at various angles with respect to the perpendicular to the transducer array to form a sector scan field. Ultrasound echos reflected from targets arrive at different times at the transducers. The echo signals respectively received by the transducers are delayed so that the combined echo signal can be regarded as having returned from a sharply defined target point.

The main transmitted ultrasound beam is conventionally deflected by equal angular increments. In order to prevent Moire fringes from appearing in the raster display field, the received echo signals are sampled at such intervals that the sampled points in the sector scan field exactly correspond to the picture elements or dots in the raster scan field. The sampled echo is stored successively in the storage cells of a matrix array in the direction of its columns and then retrieved in the direction of its rows. Due to the equal incremental angular deflection, however, the spacing between the sampled points corresponding to the picture elements successively arranged in each raster scan line varies in proportion to the tangent of each deflection angle with respect to the perpendicular to the transducer array. It is therefore necessary that the stored echo data be retrieved at varying speeds, and this would require the provision of a read only memory having a substantial capacity sufficient to accommodate address data for writing the echo data into and reading it from the random access memory.

SUMMARY OF THE INVENTION

According to the invention, the main ultrasound beam is deflected so that its deflection angle increases at equal tangential increment with respect to a perpendicular to the transducer array. Echo signals received by the transducer array are supplied to the scan converter where the signals are converted into digital echo data representative of the amplitude of the echo signals and sampled at a speed inversely proportional to the cosine of the angle of deflection of the beam with respect to the perpendicular so that the sampled points of the various radial scan lines are located on lateral lines parallel to the transducer array. The sampled, digitally converted data are written into a random access memory having a matrix array of storage cells in the direction of its columns, and then retrieved therefrom in the direction of its rows.

The scan converter of the invention includes an interpolator which receives the digital echo data supplied from the random access memory for generating additional data representing interpolations between successive ones of the received data and successively stores the interpolation data between the original echo data in a line memory so that the latter is filled with data greater than the data in each row of the random access memory.

The data now stored in the line memory are retrieved from its preselected storage locations successively during each raster scan period at temporarily constant, but spatially variable intervals so that the corresponding echo data on the raster scan lines have approximately equal densities. This permits the data to be made to appear to align in orthogonal directions in the viewing screen.

The reading address data for the line memory are generated by successive accumulation of an incremental address data supplied for each raster scan from a read only memory. This address data represents the address of the storage location which is the first to be retrieved from the line memory each time the raster scan is initiated. The accumulation of incremental address data is performed in response to clock pulses occurring at a rate much higher than the rate at which the raster scan is performed.

The data retrieved from the line memory are converted into analog echo signals which are used to modulate the intensity of a cathode ray beam to produce picture elements on the screen of the cathode ray display unit.

The primary object of the invention is, therefore, to secure correspondence between the sampled points in the original sector scan ultrasound field and the picture elements in the raster scan display field by deflecting the main ultrasound beam at such angles that they increase by equal amount of the tangential component.

Another object of the invention is to provide a scan converter for the sector scan type ultrasound imaging system in which the sampled echo data are retrieved at a constant speed.

A further object of the invention is to provide a scan converter for the aforesaid ultrasound imaging system which requires a storage device of relatively small memory capacity.

A still further object of the invention is to provide a scan converter in which the picture elements on the raster scan field are made to appear to align substantially in orthogonal directions.

BRIEF DESCRIPTION OF THE DRAWINGS

The invention will be further described by way of example with reference to the accompanying drawings, in which.

DETAILED DESCRIPTION

Figure 1:
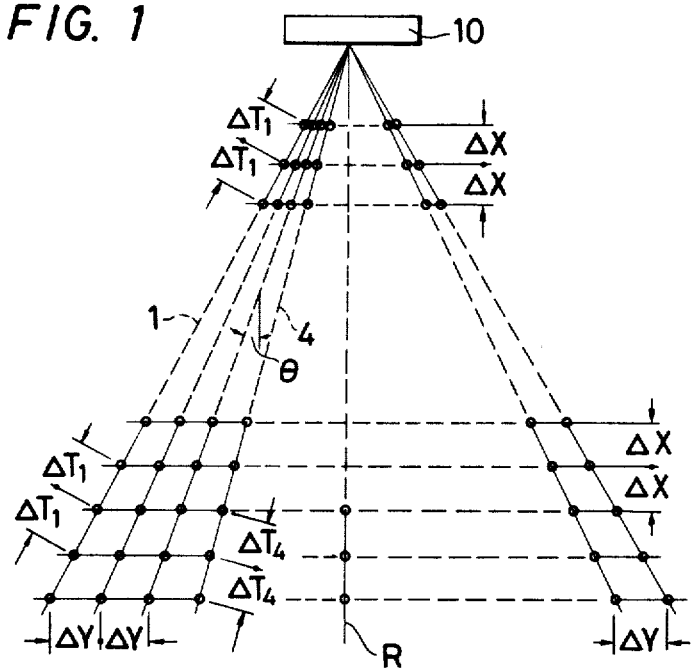
FIG. 1 is a schematic illustration of the sampled points of ultrasound beams distributed in a sector scan field with the beams being deflected by equal tangential increments according to the invention.

The sector scan type ultrasound imaging system in which the scan converter of the invention is incorporated comprises a linear array of piezoelectric transducer elements and a transmitter which drives the transducers with successively delayed bursts of pulses in the megaherz frequency range so that the transmitted ultrasound energy is formed into a main ultrasound beam. The latter beam is deflected successively at various angles by means of variable delay circuits under the control of a programmed sequence so that the main beam is deflected with a substantially equal tangential angular increment $\Delta Y$ with respect to a reference line R perpendicular to the transducer array 10 as illustrated in FIG. 1.

The transmitted ultrasound energy is reflected from interfaces between different materials or tissues of a human subject with different amplitude and arrives at the transducers at successively delayed intervals prior to the transmission of a subsequent ultrasound beam. The received echo signals are then sampled at an interval $\Delta T$ inversely proportional to the cosine of the angle of deflection of the beam to the reference line R so that the sampled points in the sector scan field align themselves in a direction parallel to the transducer array. As illustrated in FIG. 1, the sampled points indicated by black circles are spaced at equal time intervals $\Delta T_1$ for a radial scan beam 1 and at equal time intervals $\Delta T_4$ for radial scan beam 4, for example, so that the sampled points are equally spaced apart a distance $\Delta X$ in the direction parallel to the transducer array 10.

Figure 2A:
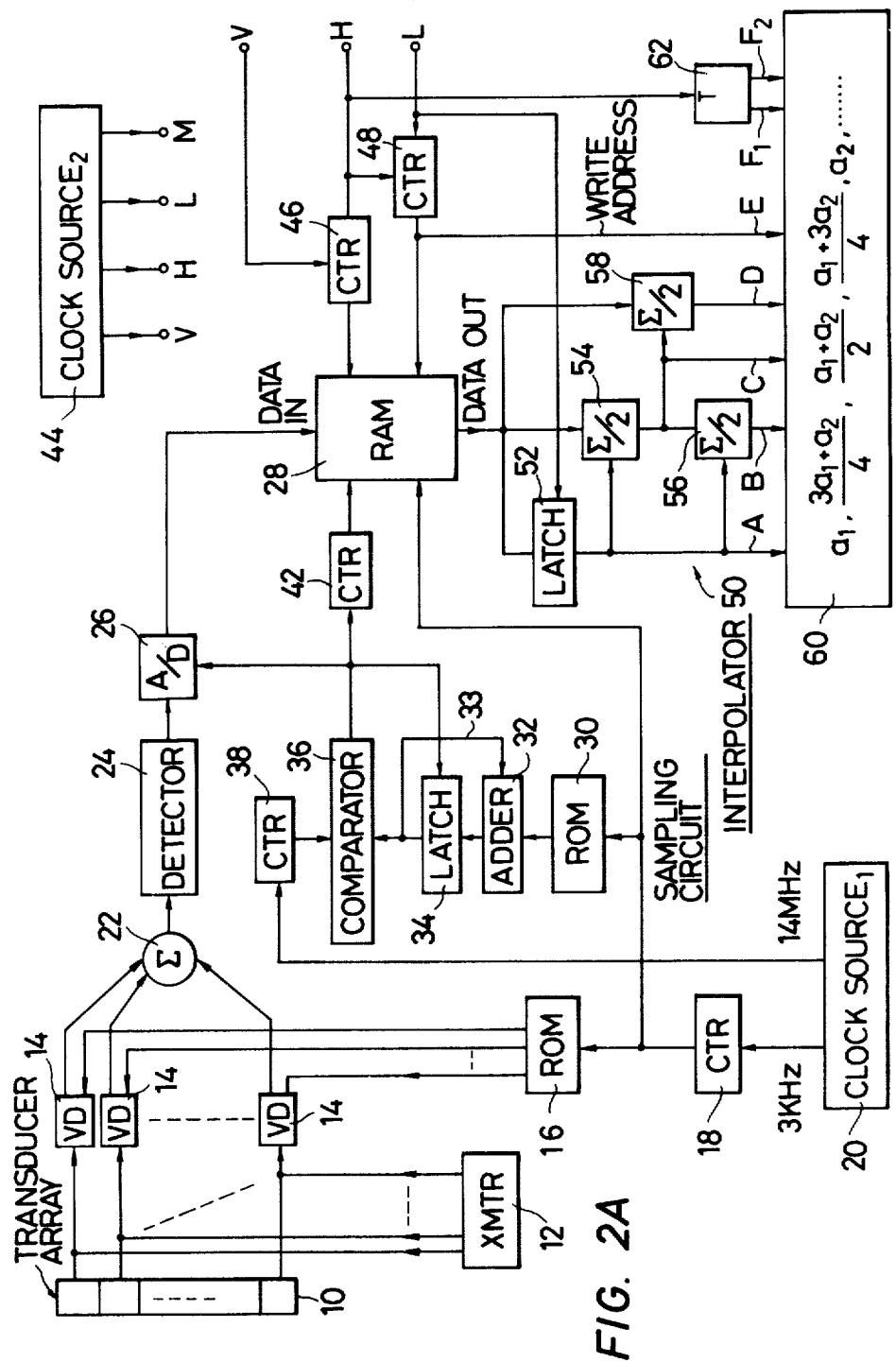
FIG. 2, separately shown in FIGS. 2A, 2B and 2C, is an illustration of a block diagram of an ultrasound imaging system of the sector scan type incorporating the scan converter of the present invention.
Figure 2B:
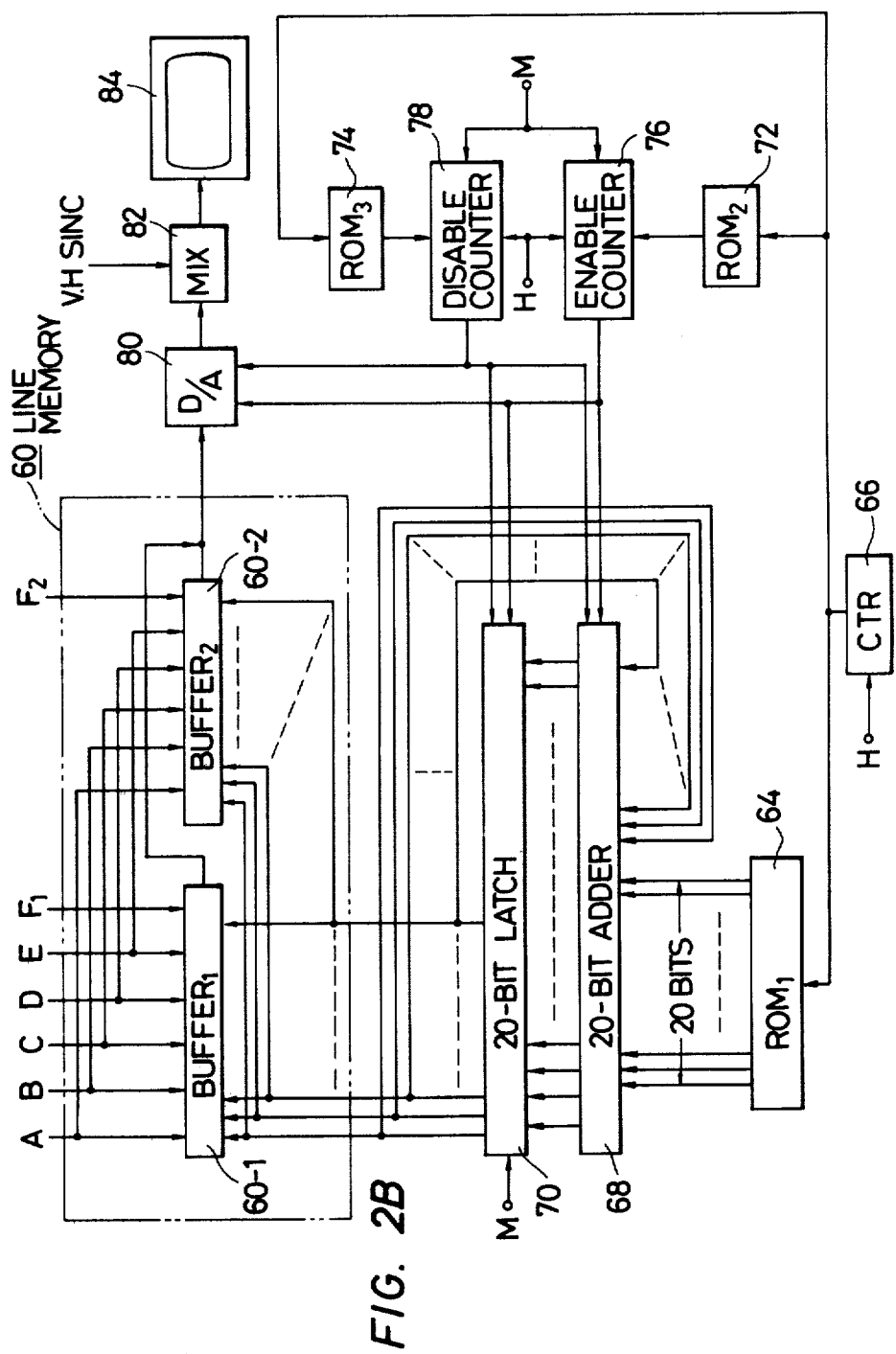
Figure 2C:
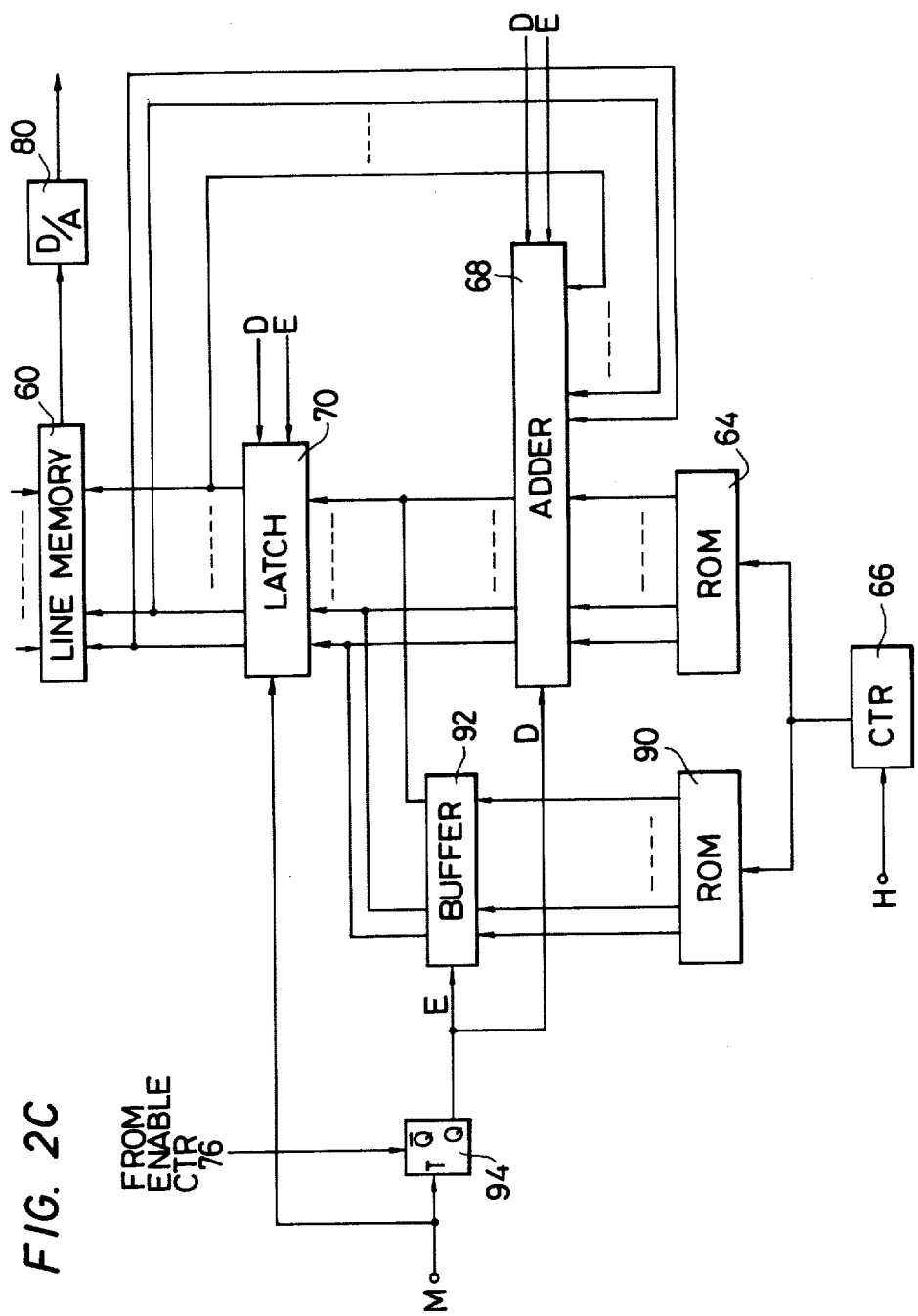

The ultrasound imaging system embodying the invention is illustrated in FIGS. 2A to 2C. The imaging system includes a transmitter 12 which energizes the transducer array 10 with successively delayed bursts of pulses in the megaherz range as described above to permit the transducer array 10 to receive returning echo pulses during the interval between successive angular deflections of the beam. The transducer array 10 converts the ultrasound echo into electrical analog signals which are fed into digitally controlled variable delay elements 14. The delay times of these delay elements are determined by a set of delay time data supplied from a read only memory 16 in response to an address data from a counter 18 at the clock rate of 3 kHz fed from a first clock source 20. The effect of these delay elements is to provide a sharp focussing of the transducer array to a desired point.

The echo signals from the delay elements 14 are supplied to an analog adder 22 and thence to a detector 24 where the high frequency components of the combined echo signal is eliminated to detect its envelope. The detector output is coupled to an analog-digital converter 26 to convert the echo signal into a digital data representative of the amplitude of the received echo signals, the converted digital data being supplied as an input to a random access memory 28.

Figure 3:
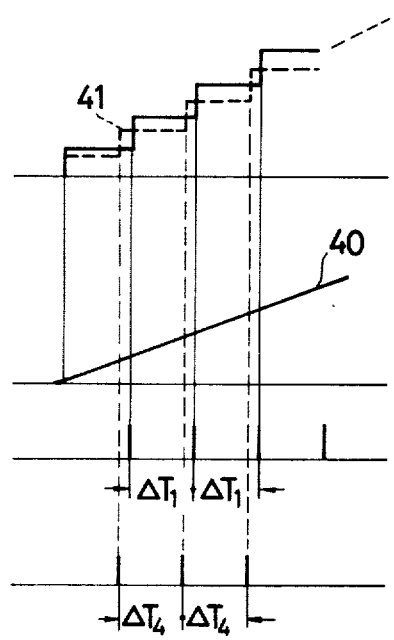
FIG. 3 is an illustration of waveforms associated with the sampling circuit of FIG. 2A.

The scan converter of the invention comprises a sampling circuit formed by a read only memory 30, a digital adder 32, a latching circuit 32, a digital comparator 34 and a binary counter 38. The read only memory 30 is provided with a set of prerecorded sampling data, each datum representing the incremental sampling interval $\Delta T$ for each radial beam. This interval is inversely proportional to the cosine of the angle $\theta$ of the respective deflection with respect to the reference line R. Each sampling datum is read out in response to an address data from the counter 18 and supplied to a first binary data input of the adder 32. The contents of the adder 32 are transferred to the latch 34 as a reference data to the comparator 36 for making a comparison with another data supplied from the counter 38. The latter is a binary representation of the number of clock pulses at 14 MHz which the counter 38 receives from the clock source 20, so that it varies with an increment of 1 bit in response to the input clock pulse as roughly indicated by a line 40 in FIG. 3. When this time-varying data reaches the reference incremental sampling data $\Delta T_1$, the comparator 36 delivers a coincidence output to the analog-digital converter 26 and to the latch 34 to cause the latter to transfer its contents to a second binary data input of the adder 32 through a feedback circuit 33 with the result that the predetermined incremental data is accumulated twice in the adder and transferred to the latch to provide a $2\Delta T_1$ data to the comparator 36. Therefore, the sampling data is successively accumulated or multiplied successively by integers to generate coincidence outputs from the comparator 36 at equal intervals of $\Delta T_1$.

In this way, the echo signals returning along the path of beam 1 are sampled at intervals $\Delta T_1$. When sampling the echo signals along the path of beam 4, an incremental sampling datum $\Delta T_4$ is read out from the ROM 30 into the adder 32 and the above process is repeated to successively accumulate the data with an increment of $\Delta T_4$ as indicated by broken lines 41 in FIG. 3 and coincidence outputs are generated at intervals of $\Delta T_4$.

Figure 4:
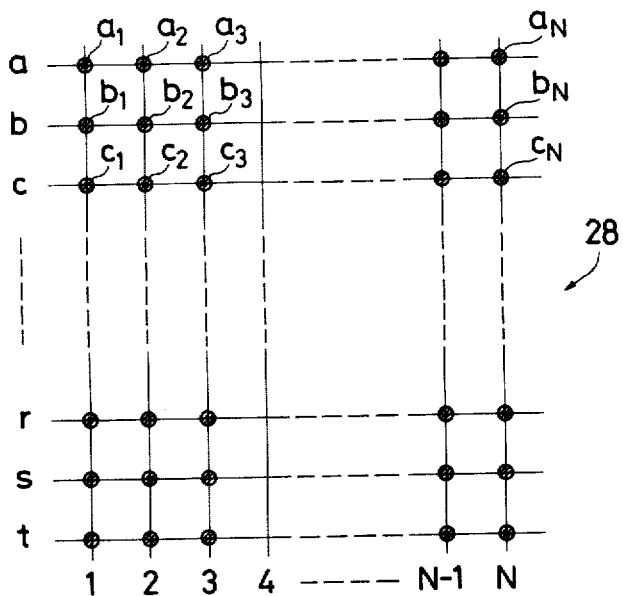
FIG. 4 is a schematic illustration of the matrix array of the random access memory of FIG. 2A showing the locations of echo data sampled in accordance with FIG. 1.

The random access memory 28 is of a conventional design which comprises a matrix array of storage cells in the form of rows and columns which correspond to the sampled points. The digital echo data from analog-digital converter 26 is written into the RAM 28 in the direction of its columns in response to a row address data from the counter 18 and a column address data, the latter being supplied from a counter 42 in response to each coincidence output from the comparator 36. It is thus seen that the sampled data are stored in the cells of RAM 28 as shown in FIG. 4 at the intersections of columns designated 1 through N and rows designated a, b, c through t, for example.

Although the RAM 28 can be addressed by as many address data stored in the ROM 30 as there are storage cells in each column of the RAM 28, the successive accumulation of the incremental address data as many times as the number of storage cells in the column provides the effect of substantially reducing the memory capacity of the read only memory 30.

The data stored in the RAM 28 are retrieved in response to timing pulses supplied from a second clock source 44. The clock pulse V occurs at intervals corresponding to the vertical synchronization of a cathode-ray display unit, the clock pulse H corresponding to the horizontal synchronization. The clock source 44 further generates clock pulses L and M, where the pulse L occurs (1/N)th interval of the horizontal scan period, where N is the total number of ultrasound beams in the sector field, while the pulse M occurs at a much higher rate than pulses L, the typical value being 14 MHz.

Address counters 46 and 48 receive clock pulses H and L to respectively generate row and column address data for the purpose of reading the data from the RAM 28 in the direction of its rows. Specifically, the data stored in each row are serially retrieved during each horizontal scan period at a constant speed in response to the column address data from the counter 48 and shifted to the next adjacent row in response to the row address data from the counter 46. To clear the binary contents of the counters 46 and 58, clear pulses V and H are respectively applied to the counters 46 and 48.

The data so retrieved in the direction of rows from the RAM 28 are supplied to an interpolator 50 to generate additional echo data representing interpolation between those successively retrieved from the RAM 28. As an exemplary embodiment the interpolator 50 comprises a digital latch 52 and a plurality of digital adders 54, 56 and 58. Each of these adders is designed to perform the function of addition to form the sum of two input binary data impressed upon it and of delivering an output data which is the sum of the two input data divided by decimal "2". More specifically, each adder may comprise a number of binary digits for each input data to provide addition and a number of output binary digits which are taken from the upper higher significant bits except for the least significant bit.

Assume that when digital echo data $a_1$ and $a_2$ are successively retrieved from the RAM 28 (see FIG. 4), data $a_1$ appears at the output of latch 52 when subsequent data $a_2$ appears at the data output terminal of the RAM 28. The output of the latch 52 is also directly applied to terminal A. The adder 54 provides an output data $(a_1+a_2)/2$ to the adder 56 as well as to terminal C. The adder 56 received its another data from the latch 52 to form an output data $(3a_1+a_2)/4$ which is applied to a terminal B to serve as a first interpolation data, the data supplied to the terminal C serving as a second interpolation data. The adder 58 received its inputs from the data output terminal of the RAM 28 and from the output of adder 54 to form an output $(a_1+3a_2)/4$ and applies it to a terminal D as a third interpolation data. The latch 52 is responsive to the clock pulse L to update its contents, so that the output data supplied to terminals A to D are updated in response to the delivery of each echo datum from the RAM 28.

The data read out from the interpolator 50 are written into a line memory 60 in response to a write address data derived from the counter 48 through a terminal E in step with a write enable pulse supplied from a flip-flop 62 which alternately supplies it in response to the clock pulse H through terminals $F_1$ and $F_2$ to the line memory 60.

In FIG. 2B, the line memory 60 is shown in a greater detail as comprising a pair of buffer storage devices 60-1 and 60-2. The terminal A to E of the buffer storage devices are connected in multiple to the interpolator outputs, while the terminals $F_1$ and $F_2$ are separately connected to the outputs of the flip-flop 62 so that memories 60-1 and 60-2 are alternately enabled to accept the input data from the interpolator. The reading operation of the line memory 60 is accomplished by means of a circuit comprising a read only memory 64, a digital adder 68 and a latch 70. In the ROM 64 is stored a set of prerecorded incremental address data, each datum representing the data spacing between successive ones of preselected storage locations of the line memory 60 with respect to each raster scan. Each incremental address data, consisting of 20 bits for example, is read out in response to an output from an address counter 66 in synchronism with the horizontal clock pulse H. The adder 68 receives the retrieved incremental address data on a first binary data input and supplies its output to the latch 70 which is enabled in response to the highest rate clock pulse M. The output data from the latch 70 is coupled to the buffer memories 60-1 and 60-2 as well as to a second binary data input of the adder 68 to provide summation of the data supplied to its first and second data input terminals. Therefore, the contents of the adder 68 and hence the latch 70 are updated in response to clock pulses M to generate successively accumulated address data and the line memory data of preselected storage locations are serially retrieved at a constant speed.

Figure 5:
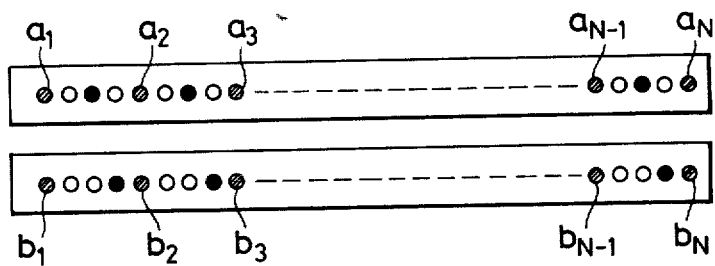
FIG. 5 is an illustration of the line memory of FIG. 2B showing the data successively stored in two raster scan periods.
Figure 6:
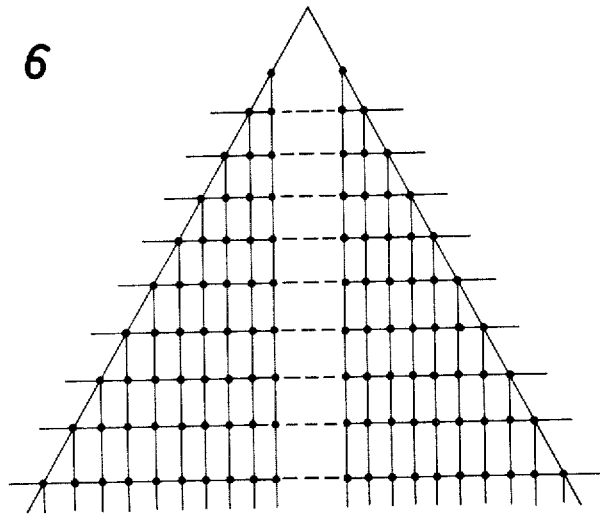
FIG. 6 is an illustration of echo data aligned in orthogonal directions on a viewing screen of a display unit.

For a better understanding of the invention, reference is made to FIG. 5 in which the line memory data are schematically illustrated. The data retrieved from the RAM 28 are indicated by shaded circles and the interpolation data are indicated by plain and black circles, with the black circles denoting the preselected storage cells. With respect to the data $a_1$ to $a_N$ associated with the row a of the RAM 28, the second interpolation data $(a_1+a_2)/2, (a_2+a_3)/2 \ldots (a_{N-1}+a_N)/2$ are assumed to have been serially retrieved from the line memory 60. With respect to the data $b_1$ to $b_N$ associated with the row b, the third interpolation data $(b_1+3b_2)/4$, $(b_2+3b_3)/4 \ldots (b_{N-1}+3b_N)/4$ are assumed to have been serially retrieved. The number of the preselected storage locations associated with each raster scan line is so determined that the data density on each raster scan is approximately equal. Otherwise stated, the data spacing of the raster scan line is varied according to the length of the raster scan across the sector field produced on the display screen. This permits the reproduced echo signals in the display field to appear to align themselves in orthogonal lines, as illustrated in FIG. 6, rather than to appear to align themselves along radially extending lines.

The scan converter further includes read only memories 72 and 74 and disable and enable presettable counters 76 and 78. The ROMs 72 and 74 receive their address data from the counter 66 to preset the count values of the preset counters 76 and 78, respectively. The ROM 72 is provided with a set of data, each representing the distance from a reference point of a vertical line of the display screen to the starting point of each of the horizontal raster scans which form the sector field. Whereas, the ROM 74 is provided with a set of data each representing the length of each raster scan line across the sector field. The preset counters 76 and 78, which are reset to zero in response to clock pulses H, receives clock pulses M to enable the adder 68 and latch 70 in response to the output of the counter 76 and to disable them in response to the output of the counter 78.

The digital output of the line memory 60 is applied to a digital-analog converter 80 where it is converted into analog echo signals during the interval defined by the outputs from the counters 78 and 78 and applied to a mixer 82 where it is mixed with vertical and horizontal synchronization signals to produce a composite video signal for application to a video display unit 84.

In the foregoing description, the line memory 60 is retrieved by the data generated by successive accumulation of the address increment data. Preferably, the first data retrieved from the line memory 60 is addressed by a predetermined initial address data on which the aforesaid address increment data is successively accumulated. This is accomplished by an embodiment shown in FIG. 2C. The initial address data are stored in a ROM 90 and each initial address datum is read out therefrom in response to the address data from the counter 66 into a buffer memory 92. This buffer memory is enabled in response to an output from a bistable device 94 whose trigger input is connected to receive clock pulses M.

At the start of each raster scan, an enable pulse from the enable preset counter 76 is applied to the reset terminal of the flip-flop 94 and a first clock pulse M causes the flip-flop 94 to generate an output at its Q output terminal to supply the contents of buffer storage device 92 to the latch 70. Therefore, the latch 70 is loaded with an initial address data at the start of each raster scan to cause the line memory 60 to deliver the associated echo data to the digital-analog converter 80. The Q output from the flip-flop 94 is also applied to the adder 68 to disable it until the occurrence of a second clock pulse M. The initial address data supplied to the line memory 60 is supplied also to the adder 68 which in response to the second clock pulse M is added up to an incremental address data in the adder 68 supplied from the ROM 64. The summation output from the adder 68 is applied to the latch 70 to perform the successive accumulation of the incremental address data on the previous data as described above.

What is claimed is:

1. A scan converter for converting successively received echo signals representative of the amplitude of ultrasound energy returning along a plurality of angularly spaced paths distributed in a sector field with a substantially equal tangential angular increment with respect to a reference line into a signal for a plurality of successive raster scan lines, comprising:

a digital storage device having storage cells arranged in a matrix array of rows and columns;

means for sampling said received echo signals at a speed inversely proportional to the cosine of the angle of said path with respect to said reference line so that the sampled points of said echo signals are located along lateral lines which are perpendicular to said reference line;

means for converting said received echo signals into digital echo amplitude representative data in response to said sampling means;

means for writing said digital echo data in said storage device in the direction of said columns;

means for retrieving the digital echo data from said storage device in the direction of said rows;

an interpolator for generating additional digital echo data representative of interpolations between succesively retrieved data from said storage device and writing said interpolation representative data and said retrieved data in a buffer storage device; and means for retrieving data from preselected storage locations of said buffer storage device at a constant rate.

2. A scan converter as claimed in claim 1, wherein said means for retrieving data from said buffer storage device comprises a second digital storage device having a plurality of prerecorded incremental address data, each datum representing the spacing between successive ones of said preselected storage locations of said buffer storage device, means for successively retrieving incremental address data from said second digital storage device in response to each raster scan line, and means for successively accumulating said retrieved incremental address data during each raster scan period to successively generate accumulated address data to retrieve the data from said buffer storage device.

3. A scan converter as claimed in claim 2, further comprising means for supplying initial address datum to said accumulating means and to said buffer storage device in response to the start of each of said raster scan lines which form a sector field, said initial datum representing a storage location of said buffer storage device corresponding to the starting point of each said raster scan line, said initial datum being supplied to said accumulating means before each of said incremental address data is supplied from said second digital storage device to said accumulating means.

4. A scan converter as claimed in claim 2, wherein said means for retrieving data from said buffer storage device further comprises a third digital storage device having a plurality of prerecorded data, each datum representing the distance from a reference point of a rectangular display field to the starting end of each said raster scan line, a fourth digital storage device having a plurality of prerecorded data, each datum representing the terminating end of each said raster scan line, means for retrieving the data stored in said third and fourth digital storage devices, and means for enabling said accumulating means in response to the data retrieved from said third digital storage device, and means for disabling said accumulating means in response to the data retrieved from said fourth digital storage device.

5. A scan converter as claimed in claim 4, further comprising means for converting the digital data retrieved from said buffer storage device into analog signals in response to said enabling means and terminating the signal conversion in response to said disabling means.

6. A scan converter as claimed in claim 2, wherein said accumulating means comprises a digital adder having a first binary data input connected to said second digital storage device, a second binary data input, and a binary data output, a latching circuit having binary data input connected to the binary data output of said adder and a binary data output connected to said second binary data input of said adder and to said buffer storage device, and means for generating clock pulses to cause said latching circuit to update its contents.

7. A scan converter as claimed in claim 6, wherein each of said enabling and disabling means comprises a presettable counter for counting said clock pulses to deliver an output in response to a count value thereof being reached, said count value being arranged to be reset to the data read out from the associated digital storage device.

8. A scan converter as claimed in claim 1, wherein said sampling means comprises a second digital storage device having a plurality of prerecorded incremental time interval data, each datum representing the interval between successively sampled points along said lateral line, said interval being inversely proportional to the cosine of the angle of said distributed paths with respect to said reference line, means for successively retrieving the prerecorded incremental time interval data from said second digital storage device, means for successively accumulating said retrieved incremental time interval data, means for comparing the data in said accumulating means with a time-varying datum which varies in binary number as a function of time for detecting a coincidence therebetween to sample said received echo signals in response thereto and to cause said accumulating means to perform subsequent accumulation of data.

9. A scan converter as claimed in claim 4, wherein said writing means includes means responsive to said comparing means for generating address data to write said digital echo data into the first-mentioned storage device in the direction of said columns.

10. A scan converter as claimed in claim 8, wherein said accumulating means comprises a digital adder having a first data input connected to said second digital storage device, a second data input and data output, a latching circuit having a data input connected to the data output of said adder and a data output connected to said second data input of said adder and to said comparing means for comparison with said time-varying data, said latching circuit being responsive to an output signal from said comparing means to update the contents thereof.

11. A scan converter as claimed in claim 1, wherein said means for retrieving data from said buffer storage device comprises means for generating address data for addressing said preselected storage locations and retrieving data from said preselected addressed locations at a constant rate regardless of the width of the sector at the raster scan line being read out and delayed in time dependent on the location of the edge of the sector field from a reference line.

12. A method of converting successively received echo signals representative of the amplitude of ultrasound energy returning along a plurality of angularly spaced paths distributed in a sector field with a substantially equal tangential angular increment with respect to a reference line into a signal for a plurality of successive raster scan lines, comprising the steps of:

sampling said received echo signals at a speed inversely proportional to the cosine of the angle of the path with respect to the reference line such that sampled points of said echo signals are located along lateral lines perpendicular to the reference line;

(a) converting the sampled echo signals into digital echo amplitude representative data;

(b) storing said sampled digital echo signals in columns to form a two-dimensional array of stored data in mutually orthogonal columns and rows;

(c) retrieving the stored data row by row;

(d) interpolating between successively retrieved data;

(e) storing said interpolation representative data and retrieved data; and (f) retrieving said interpolation data stored during step (e) at a constant rate.

* * * * *